March 27, 1956

H. C. KRONE ET AL 2,739,827

HYDRANT AND COOPERATIVE COUPLER VALVE FOR
AIRCRAFT REFUELING AND OTHER USES

Filed Nov. 15, 1952

INVENTORS!
Howard C. Krone & William Meyer,
BY George D. Richards,
Attorney

March 27, 1956
H. C. KRONE ET AL
2,739,827
HYDRANT AND COOPERATIVE COUPLER VALVE FOR
AIRCRAFT REFUELING AND OTHER USES
Filed Nov. 15, 1952
2 Sheets-Sheet 2
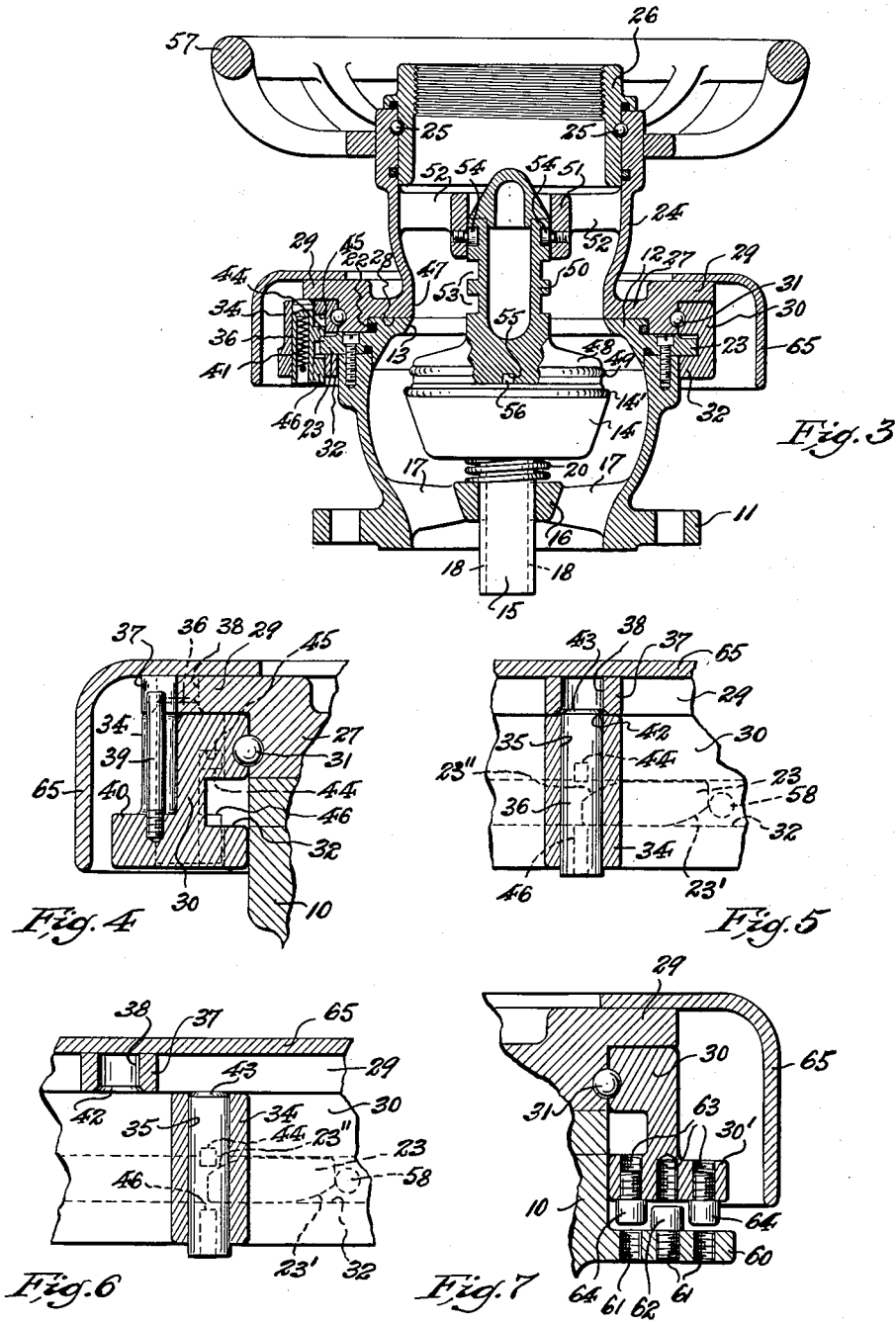
INVENTORS:
Howard C. Krone & William Meyer,
BY
George D. Richards
Attorney

United States Patent Office 2,739,827
Patented Mar. 27, 1956

2,739,827

HYDRANT AND COOPERATIVE COUPLER VALVE FOR AIRCRAFT REFUELING AND OTHER USES

Howard C. Krone, Ridgewood, and William Meyer, East Orange, N. J., assignors to Wheaton Brass Works, Union, N. J., a corporation of New Jersey Application November 15, 1952, Serial No. 320,722

8 Claims. (Cl. 284—18)

This invention relates to a valved hydrant for connection with the discharge end of a fuel supply line and a cooperative coupler valve for detachable connection therewith which is operative to couple fuel delivery hose to the hydrant, whereby to dispense fuel, e. g. gasolene, from said supply line for refueling aircraft and for similar uses.

The invention has for an object to provide a novel construction of valved hydrant and cooperative detachable hose coupler valve, so characterized that the hydrant is well adapted for installation in a countersunk pit at a loading apron of a military or commercial airfield, together, with a valved hose coupler adapted to be detachably connected with the hydrant; the arrangement of the hydrant and coupler valves being such that neither can be opened until the hydrant and coupler are joined together in sealed leak proof relation, nor can the hydrant and coupler be uncoupled until their respective valves are closed.

Another object of this invention is to provide a valved hydrant and a valved coupler for detachable connection therewith, wherein the valves thereof are so constructed and arranged that substantially no fuel can be retained between said valves, and consequently no spillage or discharge of fuel can occur when the coupler is disconnected from the hydrant, thus substantially eliminating fire hazard due to the presence of exposed fuel.

The invention has for a further object to provide a novel construction of hose coupler having a manually rotatable means which is operative by its initial rotative movement to join the hose coupler to the hydrant in sealed leak-proof connection therewith, and then, by completion of its rotative movement, to move the valve of the coupler to fully open position, the relation of the coupler valve to the hydrant valve being such that opening movement of said coupler valve is transmitted to the hydrant valve to simultaneously open the latter; said coupler valve having cam means and said rotative means of the coupler having means cooperative with said cam means to effect opening and closing movements of said coupler valve.

A still further object of this invention is to provide the hydrant and hose coupler with cooperative means adapted to be selectively related, whereby the coupler can be operatively connected only to a predetermined hydrant serving a given selected fuel.

The above and other objects of this invention will become apparent from a reading of the following detailed description of the invention in connection with the accompanying drawings, in which:

Fig. 3 is a view similar to that of Fig. 2, but showing the hose coupler and hydrant joined in leak-proof coupled relation, and manipulated to open the valves thereof.

Figure 1:
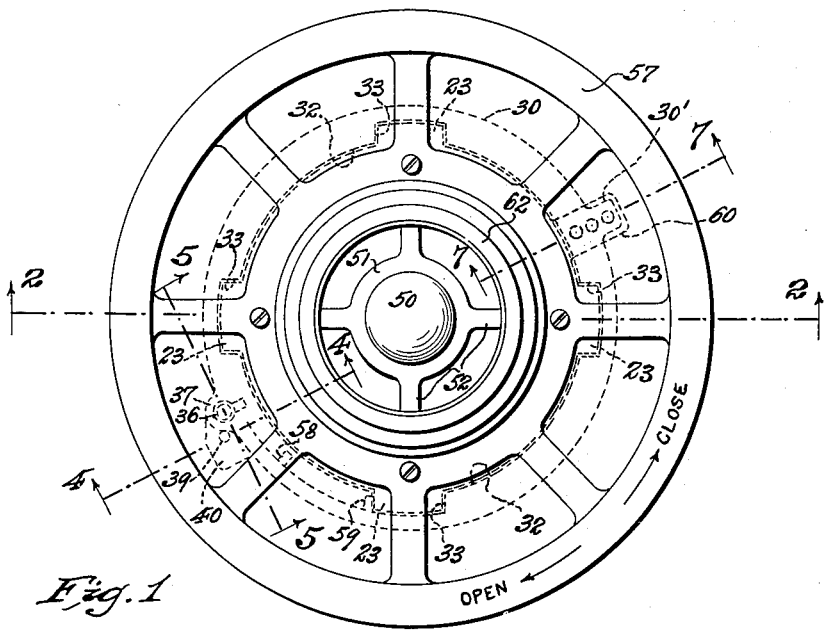
Fig. 1 is a top end elevational view of the hose coupler and hydrant engaged ready to be operatively coupled together.

Fig. 4 is a fragmentary transverse vertical section, taken on line 4—4 in Fig. 1; Fig. 5 is a fragmentary transverse vertical section, taken on line 5—5 in Fig. 1, but showing the coupling collar of hose coupler advanced to a position whereby to join the hose coupler in sealed leak-proof connection with the hydrant; Fig. 6 is a view similar to that of Fig. 5, but showing the rotative means of the hose coupler advanced to initiate opening movements of the coupler valve and hydrant valve; and Fig. 7 is a fragmentary vertical section, taken on line 7—7 in Fig. 1; all these views being drawn on an enlarged scale.

Similar characters of reference are employed in the above described views, to indicate corresponding parts.

Referring to the drawings, the hydrant comprises an endwise open body 10 having at its lower end an annular perforate flange 11, whereby the same can be bolted to the end flange of a fuel supply line (not shown) for connection therewith. Any other suitable means may be provided, however, to connect the hydrant body to the discharge end of a fuel supply line. The fuel supply line may be installed underground to lead from a source of fuel supply, and the hydrant body, as connected with such subterranean fuel supply line, can be installed in a countersunk pit at a loading apron of a military or commercial air field, all in manner already known to the art.

Figure 2:
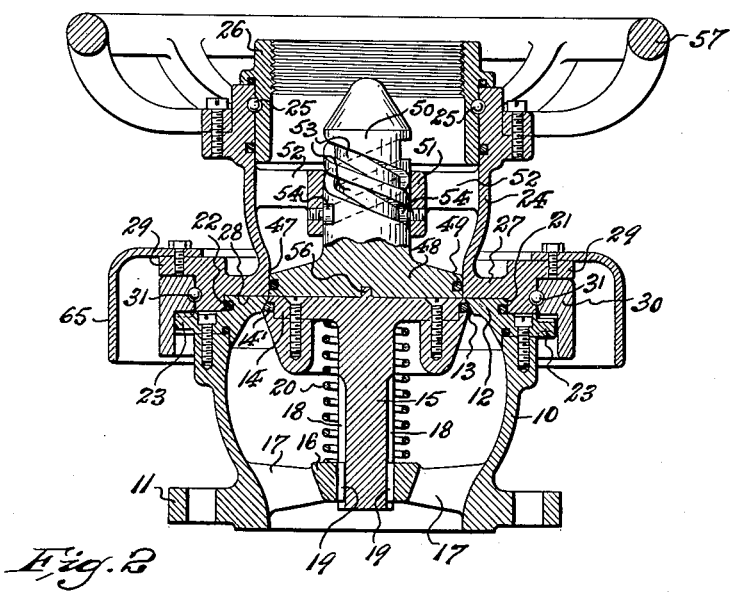
Fig. 2 is a longitudinal vertical sectional view of the same, taken on line 2—2 in Fig. 1.

Affixed to the upper end of the hydrant body is a hydrant valve seat member 12 which is provided with an axial valve port surrounded by a valve seat 13. Normally closing against said valve seat 13 is a hydrant valve 14 which is provided with a resilient seal ring 14' to engage said valve seat. Said hydrant valve is provided with a dependent axial stem 15, the lower free end of which is slidably engaged through a guide member 16. This guide member is supported from the walls of the hydrant body 10, within the lower end thereof, by spider arms 17. The hydrant valve stem 15 is provided with one or more spline grooves or channels 18 in which key members 19, provided in connection with the guide member 16, are engaged, whereby the hydrant valve 14 and its stem 15 may move axially, but are held against rotative movement. Mounted around the stem 15 between the hydrant valve 14 and the guide member 16 is a compression spring 20, which yieldably urges the hydrant valve 14 to normal closing engagement with the seat 13 of the valve seat member 12 (see Fig. 2). The hydrant valve seat member 12 is shaped to provide an upwardly projecting axial boss 21 of reduced diameter, the side margins of which form a guide shoulder in the circumferential face of which is mounted a seal ring 22. Formed in connection with the external periphery of the valve seat member 12, to project radially therefrom in circumferentially spaced relation around the hydrant, are a plurality of coupling lugs 23.

The valved hose coupler, which is adapted to be detachably connected with the above described hydrant, comprises an endwise open coupler body 24. Connected, by ball bearing means 25, with the upper end portion of said coupler body 24, in swiveling relation thereto, is a union member 26 to which the receiving end of a fuel delivery hose or conduit (not shown) can be suitably affixed. Extending outwardly from the lower end of the coupler body 24 is an annular flange 27. This flange is provided in its under face with a countersunk, downwardly open, annular socket or chamber 28 which is axially aligned with and surrounds the lower open end of the coupler body 24, and is adapted to receive the boss 21 of the hydrant body 10, when said coupler body is applied to the latter for connection therewith. When the hydrant boss 21 is entered in the coupler body socket or chamber 28, the peripheral joint therebetween is sealed against leakage by the intermediate seal ring 22.

Integral with the flange 27 of the coupler body 24, to project outwardly from its periphery in upwardly offset and overhanging relation thereto, is an annular extension or lip flange 29. Surrounding the periphery of the coupler body flange 27, beneath the lip flange 29 thereof, is a coupling collar 30. This coupling collar is supported in connection with the coupler body flange 27 by ball bearing means 31, thus being rotatably related to said coupler body flange. The height of the coupling collar 30 is such that its lower portion overhangs the upper part of the hydrant body 10 and the periphery of its valve seat member 12 from which the coupling lugs 23 project. Said lower portion of the coupling collar is provided with an internal annular channel which straddles the coupling lugs 23, and which defines, at its bottom side, an inwardly projecting annular locking flange 32. Said locking flange 32 is indented by gateway openings 33 which correspond in number and circumferential spacing to the number and circumferential spacing of said coupling lugs 23.

Formed in connection with the external periphery of the coupling collar is a lock bolt housing 34 which is provided with a perpendicular bore 35. Slidably mounted in said bore 35 is a lock bolt 36. The lip flange 29 of the coupler body flange 27 is provided with an externally projecting ear 37 which normally overhangs the upper end of the lock bolt housing 34 of the coupling collar, and which is provided with a perpendicular socket 38 for the reception of the lock bolt 36. An upstanding stop post 39 is carried by a bracket extension 40 which projects from the coupling collar 30 adjacent the lock bolt housing 34. Said stop post 39 extends upwardly along the rearward side of the lock bolt housing 34, and is of such height that its upper free end portion can be engaged by the rearward side of said ear 37 when abutted by the latter, whereby to dispose the socket 38 in normal axial alignment with the lock bolt 36 carried by the coupling collar. The lock bolt 36 is yieldably thrust upward by a compression spring 41 to engage the upper end in the lock socket 38, thus normally interlocking the coupling collar 30 with the flanges of the coupler body 24 against relative rotation. Said lock socket 38 is provided at its lower end with a female conical cam section 42. The lock bolt 36 is provided at its upper end with a male conical cam section 43 which is cooperative with said female conical cam section 42 for purposes hereinafter explained.

Projecting radially from the inner side of the lock bolt 36 is a stop tongue 44 which normally abuts a stop shoulder 45, formed in connection with the coupling collar 30, to thereby limit the upward locking movement of the said lock bolt. Also projecting radially from the inner side of the lock bolt 36, and spaced below said stop tongue 44 for a distance approximating the height of the internal channel with which said coupling collar is provided, is a lock bolt retractor tongue 46 which is adapted to be engaged by a coupling lug 23 of the hydrant, whereby to retract the lock bolt 36 from its normal upwardly projected relation into the lock socket 38 of the coupler body lip flange 29.

The lower open end of the coupler body 24 is formed to provide a port defined by its cylindrical side walls, whereby the latter serve as a valve seat 47. Normally closing against said valve seat 47 is a coupler valve 48, the periphery of which is provided with a resilient seal ring 49 to seal against said valve seat 47. The coupler valve 48 is provided with an upwardly extending axial stem 50 which is slidably engaged through a guide member 51. This guide member 51 is supported from the walls of the coupler body 24 by spider arms 52. Said coupler valve 48 is provided with spiral cam raceways 53, and said guide member 51 is provided with cam rollers 54 which engage in said cam raceways 53. When the coupler body 24 is joined with the hydrant body 10, the bottom of the coupler valve 48 abuts the top of the hydrant valve 14, and, under such conditions, to prevent rotation of said coupler valve 48, the same is provided in its under face with a keyway 55 into which enters a key lug 56 with which the top face of the hydrant valve 14 is provided. Due to this, since the hydrant valve 14 cannot rotate, neither can the coupler valve 48 rotate, although both are free for axial movement.

At will be understood from the above description as thus far set forth, it will be obvious that the coupler body 24 can be rotated about its vertical axis between the hose union member 26 and the hydrant body 10 to which said coupler body is joined. Means is therefore provided for manually rotating said coupler body, said means comprising a hand wheel 57 which is suitably affixed thereto.

To operatively connect the valved coupler to the hydrant, the former is so aligned to the latter that the gateway openings 33 of the coupling collar 30 are opposed to the coupling lugs 23 of the hydrant, whereupon the coupler is thrust onto the hydrant so as to carry the locking flange 32 of said coupling collar to a plane underlying said coupling lugs 23, and so that the socket or chamber 28 of the coupler receives the boss 21 of the hydrant with the seal ring 22 sealing the joint therebetween. When the coupler is thus applied to the hydrant, the face of the coupler valve 48 abuts the face of the non-rotatable hydrant valve 14, with the key 56 of the latter engaged in the keyway 55 of the former, so that said coupler valve 48 is held against rotative movement. The coupler is now ready to be secured in interlocked coupled relation to the hydrant.

To first secure the coupler in interlocked coupled relation to the hydrant, the hand wheel 57 of the rotatable coupler body 24 is manipulated to turn said coupler body in clockwise direction. Since the coupling collar 30 carried by the coupler body 24 is initially locked to the latter by the lock bolt 36, the initial clockwise rotation of the coupler body is transmitted to said coupling collar, whereby the latter is rotated to move its locking flange beneath the coupling lugs 23 of the hydrant, thereby interlocking the coupler and hydrant together in operative connected relation. The rotative movement of the coupling collar 30 carries the retractor tongue 46 of the lock bolt 36 into engagement with the rearward end of an adjacent coupling lug 23, the underside of which is chamfered to provide a cam portion 23' (see Figs. 5 and 6). As the lock bolt retractor tongue 46 passes beneath said coupling lug 23, it is moved downward by its engagement therewith, whereby to draw downward the lock bolt 36, against the tension of its thrust spring 41, until the male conical cam section 43 of said lock bolt is disposed in the plane of the female conical cam section 42 of the lock socket 38 of the flanged coupler body 24 (see Fig. 5). By the time the lock bolt 36 is thus retracted, further advancing rotative movement of the coupling collar 30 is arrested by abutment of a stop pin 58, with which it is provided (see Figs. 1, 5 and 6), against the rear end of said adjacent coupling lug 23. When the coupling collar 30 is thus arrested, the lock bolt 36 is stopped at the forward end portion of said adjacent coupling lug 23, the top of which is chamfered as at 23" (see Figs. 5 and 6) to provide clearance space between said coupling lug and the stop tongue 44 of the lock bolt.

The coupler having been secured in interlocked coupled relation to the hydrant in the manner above described, the coupler can be further manipulated to cause its valve 48 to open, and in opening, to cause the hydrant valve 14 to also open. This valve opening manipulation of the coupler is accomplished by continuing the clockwise rotation of the coupler body 24 by means of the hand wheel 57. As rotation of the coupler body 24 is continued, the lock socket 38 of the lip flange 29 is moved onward away from the lock bolt 36. Such advancing movement of the lock socket 38 carries its female conical cam section 42 laterally against the male conical cam section 43 of the lock bolt 36, thus further depressing said lock bolt so that the lip flange 29 of the coupler body can ride over the same (see Fig. 6). The continued rotative advance of the coupler body 24 now moves the cam rollers 54 through the effective portions of the cam raceways 53 in the stem 50 of the coupler valve 48, with the result that downward axial opening motion is transmitted to the coupler valve 48 and, in turn by the latter to the hydrant valve 14, which is thus simultaneously moved to open condition against the tension of its closing spring 20 (see Fig. 3). Fuel can now flow from the source of supply through the connected coupler and hydrant for delivery by a hose extending from the coupler to an aircraft or the like desired to be refueled.

After the refueling operation is completed, and it is desired to disconnect the coupler from the hydrant, the hand wheel 57 is turned in counter-clockwise direction, thus first reversing the operation of the cam rollers 54 in the cam raceways 53 of the coupler valve stem 50, so that the coupler valve 48 is raised and returned to normal closed relation to the coupler body 24, whereby at the same time, the hydrant valve 14 is likewise moved to closed position by its closing spring 20. It will be obvious that coupler and hydrant valves 48 and 14 are thus caused to close before the coupler can be disconnected from the hydrant. It will also be obvious that, due to the relation of said coupler and hydrant valves one to the other when closed, no fuel can collect exteriorly of or between said valves subject to spilling or escape when the coupler and hydrant are subsequently disconnected.

After the coupler and hydrant valves close, continued counter-clockwise rotation of the coupler body 24 carries the ear 37 of the coupler body lip flange 29 into engagement with the stop post 39 of the coupling collar 30, thus bringing the socket 38 of said ear again into axial alignment with the lock bolt 36 carried by said coupling collar, so that said lock bolt can make initial entrance into said socket 38. After this occurs, the coupling collar 30 accompanies the counter-clockwise rotative movement of the coupler body 24, so that the retractor tongue 46 of the lock bolt 36 moves over and away from the engaged coupling lug 23, whereupon the lock bolt 36 completes its upward movement to fully engaged entrance into said lock socket 38. Thereafter the counter-clockwise rotative movement of the interlocked coupling collar 30 and coupler body 24 is continued until arrested by abutment of a second stop pin 59, which is also carried by the coupling collar 30, against the forward end of an adjacent coupling lug 23 (see Fig. 1). When the coupling collar and coupler body are thus arrested, the gateway openings 33 of the locking flange 32 of the coupling collar will be stopped in alignment with the coupling lugs 23 of the hydrant body, thereupon permitting the coupler to be detached and removed from the hydrant.

At aircraft refueling stations provision may be made for selective service of fuels of differing characteristics. In such case, given fuels are supplied from sources thereof each to a given hydrant from which it is to be dispensed. Under such circumstances it is desirable to provide means whereby a coupler and hose to be used for delivery of a given selected fuel can be operatively connected only to a hydrant to which such selected fuel is supplied. To this end, the hydrant and coupler are provided with commutable cooperative means adapted to be variously arranged so as to prevent connection of a given coupler to all but a given selected hydrant. An illustrative form of cooperative means for this purpose is shown in Figs. 1 and 7, and comprises a bracket member 60 disposed to project radially outward from the hydrant body 10; said bracket member being provided with a row of spaced internally screw-threaded sockets 61 for selective reception of one or more upwardly projecting guard studs 62. Similarly, the coupling collar 30 is provided, in the underside of its body and a radial extension 30' thereof, with a similar row of correspondingly spaced internally screw-threaded sockets 63 for selective reception of one or more downwardly projecting guard studs 64. When the coupler body 24 with its coupling collar 30 is in normal initial condition ready for application to a hydrant, the row of sockets 63 of the coupling collar 30 will be disposed in aligned opposition to the row of sockets 61 of the hydrant bracket member 60. If guard studs 64 and 62 are respectively mounted in selected sockets so as to be disposed in a predetermined staggered relation, then downward movement of the coupler body 24 into engagement with the hydrant will not be obstructed, since the guard studs 64 are out of axial alignment with the guard studs 62, and therefore can intermesh (see Fig. 7). It will be obvious that, a given relation of the guard studs 64 and 62 having been predetermined, only a coupler having its guard stud in such relation to the hydrant guard studs can be connected to the hydrant. On the other hand, if any guard stud 64 is disposed to be in axial alignment with any guard stud 62, such axially aligned studs will abut, and will consequently obstruct downward movement of the coupler body into operative engagement with the hydrant. It will be understood that by mutation of the relative mounted disposition of the guard studs 64 and 62, the couplers can be conditioned subject to connected application only to selected hydrants.

The flanged coupler body 24 is preferably provided with an annular guard hood 65 which is affixed to the lip flange 29 so that its skirt is outwardly offset to depend in surrounding relation to the bottom end portion of the coupler body and the coupling collar 30 associated therewith, whereby, when the coupler is disconnected and removed from a hydrant, these parts are protected against injury as the coupler is moved about.

Having now described our invention, we claim:

1. In combination, a stationary hydrant and a coupler for detachable connection therewith, said hydrant comprising a hydrant body the lower end of which is adapted to be connected to a supply line, said coupler comprising a manually rotatable coupler body, said hydrant body and coupled body having cooperative means to seal the latter in applied relation to the former, said hydrant body having external coupling lugs radially projecting from its upper end portion, an external coupling collar rotatably mounted on and around the lower end portion of the coupler body and provided with an internal marginally indented locking flange to engage the coupling lugs of the hydrant body, said coupling collar and coupler body having cooperative means to lock the coupling collar against rotative movement relative to the coupler body while moving the locking flange into coupled engagement with coupling lugs of the hydrant body to thereby secure the coupler in attached relation to the hydrant, means to release said lock means after the locking flange of the coupling collar is in engagement with the coupling lugs of the hydrant body, whereby to permit continued independent rotation of the coupler body, means to arrest rotative movement of the coupling collar during continued independent rotation of the coupler body, said coupler body and hydrant body having normally closed movable valves, and means actuated by rotation of the coupler body operative to move said valves to open positions.

2. The combination defined by claim 1, wherein the means to releasably lock the coupling collar to the coupler body comprises a perpendicular spring projected lock bolt carried by the coupling collar, the coupler body having an external annular lip flange overhanging said coupling collar and provided with a socket for reception of said lock bolt when the latter is upwardly projected by its spring, said lock bolt having an inwardly projecting lateral retractor tongue adapted, when carried beneath and into engagement with a coupling lug of the hydrant body toward which it is advanced by rotative movement of the coupling collar in company with the manually rotated coupler body, to withdraw the lock bolt from said socket, whereby to permit continued advancing rotation of the coupler body while the coupling collar is arrested in its coupled engagement with the coupling lugs of the hydrant body.

3. The combination defined by claim 2, further including means to axially align said socket with the lock bolt for reception of the latter upon retractive rotative movement of the coupler body relative to the coupling collar, and means to positively arrest retractive movement of the interlocked coupler body and coupling collar, whereby to position the coupler body in releasable relation to the hydrant body.

4. In combination, a stationary hydrant and a coupler for detachable connection therewith, said hydrant comprising a hydrant body the lower end of which is adapted to be connected to a supply line and having a port at its upper end, said coupler comprising a manually rotatable coupler body the upper end of which is adapted to be connected to hose in swiveling relation thereto and having a port in its lower end, said hydrant body and coupler body having cooperative means to seal the latter in applied relation to the former, said hydrant body having external coupling lugs radially projecting from its upper end portion, an external coupling collar rotatably mounted on and around the lower end portion of the coupler body and provided with an internal marginally indented locking flange to engage the coupling lugs of the hydrant body, said coupling collar and coupler body having cooperative means to lock the coupling collar against rotative movement relative to the coupler body while moving the locking flange into coupled engagement with coupling lugs of the hydrant body to thereby secure the coupler in attached relation to the hydrant, means to release said lock means after the locking flange of the coupling collar is in engagement with the coupling lugs of the hydrant body, whereby to permit continued independent rotation of the coupler body, means to arrest rotative movement of the coupling collar during continued independent rotation of the coupler body, an axially and inwardly movable but non-rotatable yieldable valve within the hydrant body to normally close the port thereof, an axially and outwardly movable valve within the coupler body to normally close the port thereof, said valves having cooperative means to interlock the same together against rotation when the coupler body is operatively connected to the hydrant body, said coupler valve having a stem provided with spiral cam raceway means, and said coupler body having means engaging said cam raceway means, whereby, rotative movement of the coupler body in one direction, moves said valves to open positions, and, rotative movement of the coupler body in the opposite direction, moves said valves to closed positions.

5. The combination defined by claim 4, wherein the means to releaseably lock the coupling collar to the coupler body comprises a perpendicular spring projected lock bolt carried by the coupling collar, the coupler body having an external annular lip flange overhanging said coupling collar and provided with a socket for reception of said lock bolt when the latter is upwardly projected by its spring, said lock bolt having an inwardly projecting lateral retractor tongue adapted, when carried beneath and into engagement with a coupling lug of the hydrant body toward which it is advanced by rotative movement of the coupling collar in company with the manually rotated coupler body, to withdraw the lock bolt from said socket, whereby to permit continued advancing rotation of the coupler body while the coupling collar is arrested in coupled engagement with the coupling lugs of the hydrant body.

6. The combination defined by claim 5, further including means to axially align said socket with the lock bolt for reception of the latter upon retractive rotative movement of the coupler body relative to the coupling collar, and means to positively arrest retractive movement of the interlocked coupler body and coupling collar, whereby to position to coupler body in releaseable relation to the hydrant body.

7. The combination defined in claim 1, which further includes mutatable means to predetermine mating conditions of a coupler body and hydrant body prerequisite to operative connection of the former to the latter, said means comprising guard stud supporting means with which the hydrant body is provided, cooperative guard stud supporting means with which the coupling collar of the coupler body is provided, guard studs respectively carried by said respective supporting means, and means to vary the mounted positions of guard studs on said supporting means, whereby to predetermine cooperative relations between those carried by the supporting means of the hydrant body and those carried by the supporting means of the coupling collar of the coupler body.

8. The combination defined by claim 6, which further includes mutatable means to predetermine mating conditions of the coupler body and hydrant body prerequisite to operative connection of the former to the latter, said means comprising guard stud supporting means with which the hydrant body is provided, cooperative guard stud supporting means with which the coupling body is provided, guard studs respectively carried by said respective supporting means, and means to vary the mounted positions of guard studs on said supporting means, whereby to predetermine cooperative relations between those carried by the supporting means of the hydrant body and those carried by the supporting means of the coupling collar of the coupler member.

References Cited in the file of this patent

UNITED STATES PATENTS

| | | |
|---|---|---|
| 2,519,358 | Davies | Aug. 22, 1950 |

FOREIGN PATENTS

| | | |
|---|---|---|
| 854,220 | France | Jan. 4, 1940 |
| 859,331 | France | June 3, 1940 |